United States Patent

Abys et al.

Patent Number: 6,126,807
Date of Patent: Oct. 3, 2000

[54] PROCESS FOR MAKING SODIUM GOLD SULFITE SOLUTION

[75] Inventors: Joseph Anthony Abys, Warren; Joseph John Maisano, Branchburg, both of N.J.

[73] Assignee: Lucent Technologies Inc., Murray Hill, N.J.

[21] Appl. No.: 09/302,360

[22] Filed: Apr. 30, 1999

[51] Int. Cl.[7] .............................. B22F 7/00; C09D 5/00; C09D 5/10; C23C 16/00; C23C 18/00

[52] U.S. Cl. ..................... 205/266; 205/495; 106/1.26

[58] Field of Search ................... 205/266, 242, 205/248, 495; 106/1.23, 1.26; 252/62.2, 520.3; 423/265, 519.2

[56] References Cited

U.S. PATENT DOCUMENTS

| | | |
|---|---|---|
| Re. 35,513 | 5/1997 | Nobel et al. . |
| 3,057,789 | 10/1962 | Smith ........................ 205/266 |
| 3,966,880 | 6/1976 | Dietz, Jr. et al. .................. 423/265 |
| 4,192,723 | 3/1980 | Laude et al. ............................ 205/248 |
| 4,316,786 | 2/1982 | Yu et al. . |
| 4,372,830 | 2/1983 | Law . |
| 5,575,900 | 11/1996 | Antelman et al. . |

FOREIGN PATENT DOCUMENTS

| | | |
|---|---|---|
| 54-134042 A2 | 10/1979 | Japan . |
| 56-136994 A2 | 10/1981 | Japan . |
| 08239768 A2 | 9/1996 | Japan . |

Primary Examiner—Kathryn Gorgos
Assistant Examiner—Wesley A. Nicolas

[57] ABSTRACT

A process for producing sodium gold sulfite in solution is described. The sodium gold sulfite solution is useful in gold electroplating baths, and can be used in applications which require pure, soft gold deposits. A process is also described whereby the sodium gold sulfite solution can be solidified by a freeze-drying process.

8 Claims, 2 Drawing Sheets

PROCESS FOR MAKING SODIUM GOLD SULFITE SOLUTION

BACKGROUND OF THE INVENTION

1. Field of the Invention

The present invention relates to process for making a gold salt to be used in electroplating processes; and more particularly to a process for making sodium gold sulfite.

2. Description of the Prior Art

Electroplating is a widely practiced technique for producing gold or gold alloy coatings for decorative or industrial purposes. Historically, the gold electroplating bath formulations have been primarily based on cyanide, predominantly the cyanide complex of monovalent gold, $(Au(CN)_2)^-$. Although these formulations have been successful, the use of extremely toxic cyanide ions is not desirable.

Electroplating solutions containing gold in the form of a soluble sulfite complex have been growing in use due to the fact that they avoid the more dangerous gold cyanide complexes. Gold sulfite baths are believed to provide better ductility and throwing power, a good alloy deposition, and a higher tolerance to impurities. Although these solutions have the advantage of being free from cyanide ions, the production of the gold sulfite salt to be used in the electroplating solutions can be difficult, hazardous and expensive. Historically, the production of alkali metal gold sulfite salts utilizes the explosive gold fulminate as an intermediate. Gold fulminate is then added as a wet cake to a solution containing excess sodium sulfite to form the desired pale yellow sodium gold sulfite solution. Trace levels of the gold fulminate remain as a by-product such that acid salts prepared from the solutions can be hazardous to handle.

Gold sulfite salts in solution become unstable over time as a result of the oxidation of sulfite to sulfate. Therefore, it is desirable to convert the gold salt to the more stable solid form for transportation and storage purposes. It is also cheaper to transport the lighter solid salt than it is to transfer the solution containing water. One method for solidifying the solution involves evaporating the water from the solution. However, as the water evaporates to form the solid in these processes, it becomes explosive at temperatures of 75° to 85° C. If the evaporation of water is attempted at room temperature, the gold sulfite compound oxidizes and is unusable for electroplating. An alternative method for solidifying sodium gold sulfite solutions involves precipitating gold sulfite from the solution in order to increase the gold content of the product. However, as a result, the solidified form of the salt is chemically unstable, and the sulfite oxidizes to form sulfate, while the solid metal is reduced.

One of the major problems encountered when using gold sulfite solutions in gold electroplating processes is that the amount of gold plated per quantity of electricity applied decreases with time. This is due, in part, to the fact that oxygen from the atmosphere dissolves into the plating bath, oxidizing the sulfite to sulfate. The prior art suggests solving this problem by purging the solution with nitrogen or by using chemical oxygen scavengers to remove the dissolved oxygen. However, this technique may not always be practical since the physical set-up may not lend itself to nitrogen purging. Additionally, the gas and equipment are expensive, controls must be used, and the amount of agitation required is too large. Another solution suggested by the prior art is to use stabilizers, such as sodium thiocyanate. The disadvantage to using sodium thiocyanate is that the plating bath must be maintained at a pH of less than 7 in order to prevent the reduction of gold.

SUMMARY OF THE INVENTION

In the process of the present invention, a sodium gold sulfite solution is prepared from barium hydroxide and sodium hydroxide. This process affords the sodium gold sulfite as a concentrated solution in the absence of undesirable and dangerous by-products, such as gold fulminate. In another aspect of the invention, the sodium gold sulfite solution is solidified by a freeze-drying process. This freeze-drying process allows for the preparation of sodium gold sulfite in solid form which is oxidatively stable and therefore safer for transportation and storage. The solid form is also less expensive to ship since the water has been removed from the product. The invention also provides for a gold sulfite electroplating bath solution containing an alkali metal pyrophosphate salt which stabilizes the bath solution by preventing the oxidation of sulfite ions to sulfate ions. In another aspect of the invention, the waste gold from the sodium gold sulfite process is recycled as a starting material to provide a more cost effective production.

BRIEF DESCRIPTION OF THE DRAWINGS

The present invention will become more fully understood from the detailed description given hereinbelow and the accompanying drawings which are given by way of illustration only, wherein.

DETAILED DESCRIPTION OF THE PREFERRED EMBODIMENTS

Figure 1:
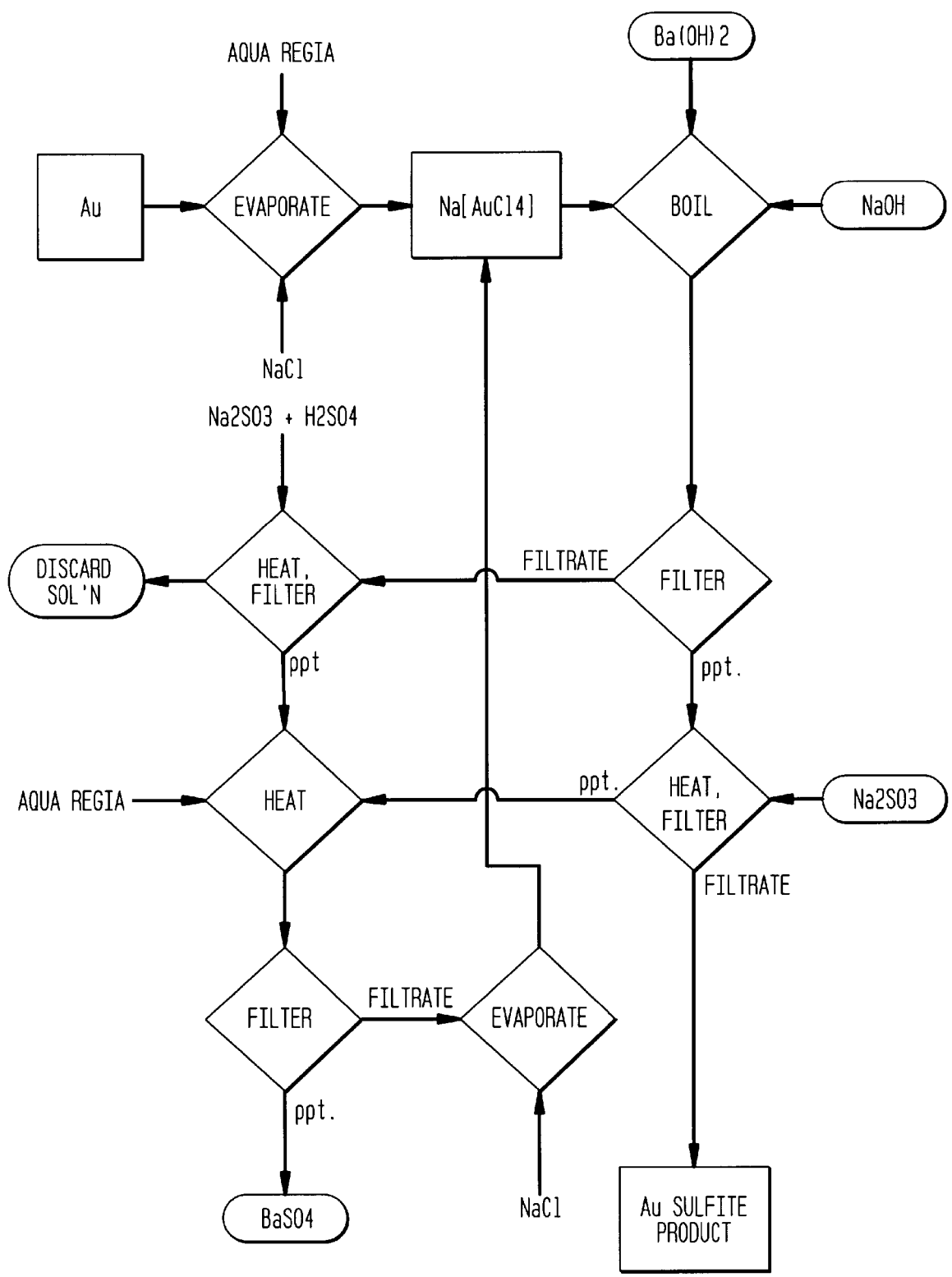
FIG. 1 illustrates the process of the invention whereby a concentrated sodium gold sulfite solution is produced, and whereby the unrecovered gold is isolated and recycled.

The present invention provides for a process of preparing sodium gold sulfite in solution, wherein the process includes:

(a) reacting $Na(AuCl_4)$ with sodium hydroxide and barium hydroxide to produce a barium aurate salt and additional by-products;

(b) reacting an aqueous solution of barium aurate and sodium sulfite to produce sodium gold sulfite and additional by-products in solution;

(c) recovering the sodium gold sulfite solution.

More specifically, the invention can be described by the process including:

(a) dissolving $Ba(OH)_2$ in an aqueous solution of $Na(AuCl_4)$ to produce a mixture;

(b) mixing NaOH with said mixture to produce a suspension;

(c) boiling the resulting suspension;

(d) adjusting the pH of the suspension from step (c) to produce a precipitate and a filtrate;

(e) dissolving $Na_2SO_3$ in a slurry of the precipitate from step (d) to produce a suspension;

(f) heating the suspension from step (e);

(g) filtering the suspension from step (f) to produce a filter cake and a filtrate; and (h) recovering filtrate as sodium gold sulfite in solution.

It is preferred in step (a) to heat the aqueous solution of $Na(AuCl_4)$ to a temperature sufficient to dissolve the $Na(AuCl_4)$ in water, preferably about 70° to 90° C., prior to dissolving the Ba(OH)$_2$. More preferably, the temperature should be between about 75° and 85° C., and most preferably 80° C. Preferably, the pH in step (a) is less than 10. The barium hydroxide octahydrate can be used in step (a). It is preferred that the Na(AuCl$_4$), sodium hydroxide and barium hydroxide in steps (a) and (b) are added in amounts sufficient to produce a precipitate.

In step (b), it is preferred that the NaOH added to the mixture of step (a) is a concentrated aqueous solution. A preferred concentrated aqueous solution of NaOH is approximately 50% NaOH. The amount of NaOH added should be sufficient to produce a precipitate, prior to the boiling of the resulting suspension. Preferably, the suspension is boiled for approximately 15 minutes.

In step (d), the pH is preferably adjusted, if necessary, to be between about 6 and 8. The pH can be adjusted by adding an acid or base, preferably HCl or NaOH, to the suspension. Once the precipitate from step (d) is collected, it may optionally be washed one or more times with cold deionized water. At this point, the wash water and filtrate can be collected for gold analysis and work-up if desired. The precipitate is slurried in deionized water for use in step (e).

It is preferable to heat the slurry of the precipitate prior to dissolving the Na$_2$SO$_3$ in step (e). Preferably, the slurry is heated to about 55–65° C. Optionally, sodium hydrogen sulfate can also be added with the sodium sulfite in step (e). The resulting suspension is then stirred and heated to about 50–65° C., preferably for a period of time sufficient to allow the suspension to become blue or purple. The suspension can then be separated by filtration into a precipitated filter cake and a filtrate. The filtering can be accomplished by any method which affects the separation, such as suction, pressure or gravity filtration. The filtrate contains sodium gold sulfite in solution. The filter cake can be collected and recycled as the starting material Na(AuCl$_4$). Optionally, the gold content of the sodium gold sulfite solution can be adjusted to the desired concentration. Preferably, the adjustment is carried out by evaporation, if the gold content is too low, or by dilution if the gold content is too high.

The liquid concentrate form of sodium gold sulfite produced by the process of the invention generally may have a concentration in the range of about 10 to 75 grams per liter, preferably 40 to 75 grams per liter, and more preferably 75 grams per liter.

The barium hydroxide and Na(AuCl$_4$) starting materials may be prepared by conventional methods. For example, Na(AuCl$_4$) can be prepared by dissolving gold in aqua regia (one part nitric acid and three parts hydrochloric acid) followed by boiling to remove the nitric acid. Pure sodium chloride is then added to the solution and stirred to produce Na(AuCl$_4$).

It is suggested that the chemical reaction for forming the concentrated sodium gold sulfite solution can further be described by the following two steps:

(1) 2Na(AuCl$_4$)+6NaOH+Ba(OH)$_2$→Ba(AuO$_2$)$_2$↓*+ 8NaCl+4 H$_2$O (2) Ba(AuO$_2$)$_2$*+6Na$_2$SO$_3$+2 H$_2$O→2 Na$_3$[Au(SO$_3$)$_2$]+ BaSO$_4$↓+4 NaOH.

this is the assumed formula; the exact nature of the precipitate is not known.

It may be advantageous to solidify the liquid concentrate form of sodium gold sulfite for transportation and storage purposes. Thus, another aspect of the invention provides for a freeze-drying process to solidify the sodium gold sulfite solution. Using the freeze-drying process of the invention allows for safer reaction conditions, a lighter product for shipping, and a resulting solid form which is oxidatively stable over time. Thus, the present invention is also directed to a process for producing sodium gold sulfite in solid form, including:

(a) freezing an aqueous solution of sodium gold sulfite in a vacuum chamber to a temperature of about −50 to −20 C. at about 800 to 1000 mTorr to produce a frozen mass;

(b) heating the frozen mass, while maintaining the pressure and temperature at levels effective to evaporate water from the mass, until the mass is at room temperature and the vapor pressure in the vacuum chamber containing the mass is less than or equal to 150 mTorr.

Preferably, the sodium gold sulfite solution is produced in solid form by the following process:

(a) dissolving Ba(OH)$_2$ in an aqueous solution of Na(AuCl$_4$) to produce a mixture;

(b) mixing NaOH with said mixture to produce a suspension;

(c) boiling the resulting suspension;

(d) adjusting the pH of the suspension from step (c) to produce a precipitate and a filtrate;

(e) dissolving Na$_2$SO$_3$ in a slurry of the precipitate from step (d) to produce a suspension;

(f) heating the suspension from step (e);

(g) filtering the suspension from step (f) to produce a filter cake and a filtrate;

(h) recovering filtrate as sodium gold sulfite in solution;

(i) freezing the sodium gold sulfite solution in a vacuum chamber to a temperature of about −50 to −20° C. at about 800 to 1000 mTorr to produce a frozen mass; and (j) heating the frozen mass, while maintaining the pressure and temperature at levels effective to evaporate water from the mass, until the mass is at room temperature and the vapor pressure in the vacuum chamber containing the mass is less than or equal to 150 mTorr.

Preferably, the sodium gold sulfite solution is frozen to approximately −30° C. The frozen mass is then warmed slowly under vacuum at levels effective to evaporate water from the mass. For example, the vacuum differential between the pump entry and the sample chamber is preferably maintained at less than or equal to 150 mTorr. It is preferred that the entire process should be completed in about 24 hours. Through this freeze-drying process, the gold sulfite concentrate will be transformed from a clear yellow liquid solution to an orange, free-flowing powder.

The solid concentrate form of sodium gold sulfite, produced by the freeze-drying process of the invention, contains gold at concentrations of about 20 to 25 weight percent, preferably 22 weight percent. The solid form may also contain sodium sulfite such that the sodium gold sulfite to sodium sulfite ratio is about 1:3, preferably 1:2

Gold electroplating baths, which contain gold in the form of a soluble sulfite complex, are often stabilized against oxidation by purging with nitrogen or by using chemical oxygen scavengers. However, it has been found that gold electroplating baths can be stabilized against oxidation by the addition of an alkali metal pyrophosphate salt to the bath. The presence of the alkali metal pyrophosphate salt will retard the oxidation of sulfite to sulfate in the bath, thereby providing a bath that is more stable over time. Thus, the present invention is also directed to a gold electroplating bath solution, including:

(a) sodium gold sulfite; and (b) an alkali metal pyrophosphate salt.

The electroplating bath solution can be prepared by a process including:

(a) dissolving Ba(OH)$_2$ in an aqueous solution of Na(AuCl$_4$) to produce a mixture;

(b) mixing NaOH with said mixture to produce a suspension;

(c) boiling the resulting suspension;

(d) adjusting the pH of the suspension from step (c) to produce a precipitate and a filtrate;

(e) dissolving Na$_2$SO$_3$ in a slurry of the precipitate from step (d) to produce a suspension;

(f) heating the suspension from step (e) to about 50°–65° C.;

(g) filtering the suspension from step (f) to produce a filter cake and a filtrate;

(h) recovering filtrate as a concentrated sodium gold sulfite solution;

(i) adding the sodium gold sulfite solution to an aqueous solution of an alkali metal pyrophosphate salt to produce a gold electroplating bath solution.

Sodium gold sulfite is present in the electroplating bath solution at a range of approximately 0.8 to 2.5%. More preferably, the sodium gold sulfite is present at approximately 1.7%. The concentration of gold in the electroplating bath solution is approximately 10 g/L, but varies depending on the concentration of sodium gold sulfite in the bath solution. Preferably, gold is present at approximately 0.5 to 1.5%, more preferably 1.25%.

Preferably, the pyrophosphate salt is the sodium or potassium salt. More preferably, the pyrophosphate salt is the sodium salt. The pyrophosphate salt is present at approximately 2.5 to 10.0%, preferably 5%. The pyrophosphate salt is added at a concentration of approximately 15 to 60 g/L, preferably 25 g/L.

If desired, the pyrophosphate salt in the electroplating bath can be replenished during the electrolysis. It is preferable that pyrophosphate salt additions be made via a solution analysis.

The gold electroplating bath of the invention can further comprise additional additives such as brighteners, and chelaters. Examples of suitable brighteners include sodium aresenite, thallium nitrate, and cobalt and nickel sulfate. Suitable chelaters are, for example, EDTA and quadrol. The brighteners can be added at concentrations of approximately 4–12 ml/L of the bath solution, preferably 8 ml/L. Chelaters are added at approximately 0.5–5 g/L, preferably 1.5 g/L.

The electroplating bath solution is preferably maintained at a pH of approximately 6.5 to 10, more preferably 7.5 to 8. The bath can be operated at temperatures of approximately room temperature to 55° C., preferably 35 to 45° C.

Alkali metal pyrophosphate salts can be purchased commercially or can be prepared by conventional methods. For example, sodium pyrophosphate can be produced by molecular dehydration of dibasic sodium phosphate at 500° C. (Bell, *Ind. Eng. Chem.*, 39, 136 (1947)). Potassium pyrophosphate can be prepared by the dehydration of KH$_2$PO$_4$ (Pfansteil, Iler, *J. Am. Chem. Soc.*, 74, 6059 (1952)).

When the sodium gold sulfite solution is prepared according to the present invention, traces of gold remain in the filtrate and precipitates which are not used in the production process. For economical reasons, it is advantageous to recover the gold in this crude state, and recycle the gold back into the production process as the starting material, Na(AuCl$_4$). Thus, in another aspect of the present invention, a sodium gold sulfite solution is prepared according to the process of the invention, and is followed by a recycling procedure as follows:

(a) dissolving Ba(OH)$_2$ in an aqueous solution of Na(AuCl$_4$) to produce a mixture;

(b) mixing NaOH with said mixture to produce a suspension;

(c) boiling the resulting suspension;

(d) adjusting the pH of the suspension from step (c) to produce a precipitate and a filtrate;

(e) dissolving Na$_2$SO$_3$ in a slurry of the precipitate from step (d) to produce a suspension;

(f) heating the suspension from step (e) to about 50°–65° C.;

(g) filtering the suspension from step (f) to produce a filter cake and a filtrate;

(h) recovering filtrate as sodium gold sulfite in solution;

(i) adding Na$_2$SO$_3$ to the filtrate from step (d) to produce a solution;

(j) acidifying the resulting solution with sulfuric acid while heating to precipitate BaSO$_4$;

(k) collecting the BaSO$_4$ precipitate and combining with the filter cake from step (g) to produce a mixture;

(l) heating the mixture with aqua regia to produce a clean BaSO$_4$ precipitate and a filtrate;

(m) collecting the filtrate from (l) and adding NaCl to produce a solution;

(n) evaporating the solution from step (m) to obtain Na(AuCl$_4$); and (o) recycling the Na(AuCl$_4$) into step (a).

The recycling process is further outlined in FIG. 1. The filtrates and precipitates are treated to remove any excess sulfite or sulfate as BaSO$_4$. Any gold is dissolved using aqua regia such that it can be returned to the form of Na(AuCl$_4$).

The sodium gold sulfite solutions of the present invention can be used in applications which require pure, soft gold deposits for electronic applications, such as semiconductors, printed or etched circuits and contacts or connectors. It is particularly suited for plating the gold wire bonding pads on semiconductor wafers. The deposit appearance may range from a matte finish to a full bright finish, depending on the plating conditions. Generally, the gold sulfite solutions and products can be used in any process where cyanide ions are undesirable.

EXAMPLES

Example 1

Production of Concentrated Sodium Gold Sulfite Solution

To produce 2.5 liters of gold sulfite concentrate containing 40 g/l of Au, at an assumed yield of 91% (lab yield: 94%). The balance of the Au input is recoverable as Na(AuCl$_4$) for recycling into the process.

Precipitation—Dissolve Na(AuCl$_4$) containing 110 g Au(~202 g, depending on the assay) in ~2 liters of D.I. water and heat to 80° C. Under stirring, add and completely dissolve 110 g Ba(OH)$_2$ 8H$_2$O to yield a dark amber solution. Then add 66 g NaOH, preferably as a concentrated aqueous solution, to form a greenish brown precipitate (the color may vary). Raise the temperature to boiling; after 15 minutes check the pH of the supernatant solution, which should be between 6 and 8. Adjust with NaOH or HCl if necessary. Heat for 15 more minutes and check and adjust the pH again.

Washing—Cool the batch (with chilled water if available). Filter through a medium pore size paper. Wash repeatedly on the filter with small amounts of cold D.I. water. Collect the filtrate and wash water for Au analysis and work-up. Slurry the precipitate in ~2 liters of water. Heat with stirring to ~50° C. Cool, filter and collect the filtrate. Repeat the slurrying, heating, cooling and filtration two more times. Check each rinse for Au content. Instead of repeated slurrying, a continuous washing procedure may be used. Collect the washed precipitate from the filter for further processing; drying is not required.

Conversion into gold sulfite concentrate—Slurry the washed precipitate in ~2.5 liters of D.I. water. Heat to 60–65° C., and add and dissolve 400 g $Na_2SO_3$ under stirring. Continue stirring at this temperature until the color of the precipitate changes to purple or blue, with all traces of brown gone. Filter through a fine filter, and wash with a little hot water. Save the filter cake which contains some metallic Au on $BaSO_4$. Take an assay of the solution and adjust the Au content through evaporation (at ~65° C., possibly with $N_2$ sparge) if too low, or dilution if too high.

Example 2
Recycling of the Gold as $Na(AuCl_4)$

Add 1.2 g of $Na_2SO_3$ per gram of Au to the combined filtrates from Example 1. Acidify with $H_2SO_4$ and heat (80–90° C.) to reduce all gold and to precipitate all barium as $BaSO_4$. Filter and discard the filtrate which contains mostly HCl, $H_2SO_4$ and NaCl. Combine the filter cake with the filter cake of Example 1. Treat with hot aqua regia (temp) until all gold is dissolved and the $BaSO_4$ precipitate is clean. Cool and dilute with an equal volume of water. Filter off and wash the $BaSO_4$ before disposal or other use. Add the calculated amount of NaCl (0.3 g per g Au) to the filtrate and evaporate to obtain $Na(AuCl_4)$ which can be recycled into the process of Example 1.

Example 3
Preparation of an Electroplating Bath

A suitable combination of concentrations and operating parameters can be selected from the Table 1 below.

TABLE 1

| Component | Range | Typical |
|---|---|---|
| Gold as metal | 8–15 g/l | 12.5 g/l |
| Sodium gold sulfite (free) | 25–40 g/l | 31.5 g/l |
| Brightener | 4–12 ml/l | 8 ml/l |
| pH | 9–10 | 9.5 |
| Specific gravity, °Baumé | 8–30° β | 10° β |
| Temperature | 35–55° C. | 50° C. |
| Current density | 1–15 ASF | 5 ASF |
| Anode to cathode ratio | | 2:1 |
| Cathode Efficiency | | 99% |
| Plating rate at 5 ASF ($\mu$-inch/min) | | 12.5 |

To make one liter of the gold electroplating bath, add 400 ml of deionized water to a clean plating cell. Dissolve 31.5 g of sodium pyrophosphate and mix until the salts are fully dissolved. With mild agitation, add 250 ml of a concentrated sodium gold sulfite solution. Add 8 ml of a sodium aresenite solution (2.3%). Then add deionized water to make up to one liter.

Since gold metal is depleted at a rate of approximately one troy ounce per 752 ampere-minutes, it is preferable that gold metal should be replenished regularly to avoid depletion in excess of 10% of the initial concentration. The pH can be maintained using a 10% sodium hydroxide solution. Additionally, brighteners can be added as needed to maintain a smooth uniform appearance.

Example 4
Comparison of a Gold Sulfite Bath Stabilized with Pyrophosphate Salt to an Unstabilized Gold Sulfite Bath A sodium gold sulfite solution was prepared (500 mL), and 25 g of sodium pyrophosphate were added to the solution. Additionally, 500 mL of a sodium gold sulfite solution was prepared without the addition of the sodium pyrophosphate. The pH of each solution was maintained above 8.5. The solutions were heated on a hot/stir plate to 50° C., and were stirred for 8 hours/day for 5 days. The pH was monitored and adjusted, if necessary, to remain above 8.5. After 5 days, the results were as follows:

| | Bath as made | Bath without pyrophosphate (5 days) | Bath with pyrophosphate (5 days) |
|---|---|---|---|
| Au content | Not analyzed | 14.5 g/l | 15 g/l |
| Total conducting salt | 49.5 g/l | 19.5 g/l | 41.5 g/l |
| Free conducting salt | 22.2 g/l | None detected | 12.7 g/l |

The free conducting salt is the salt not used to complex the metal. The total conducting salt is the amount which is analytically determined (complexed and uncomplexed).

After 5 days of heat cycling, the bath with the pyrophosphate salt still had 57% (initial value vs. final value) of its free sodium gold sulfite content. In the bath without the pyrophosphate salt, none was detected. Additionally, the appearance of the bath without the pyrophosphate salt had a fine purple/black precipitate and a clear violet appearance. The bath with the pyrophosphate salt was still clear after 5 days and exhibited no precipitation. Thus the pyrophosphate salt of the invention can substantially increase the life of the electroplating bath.

Figure 2:
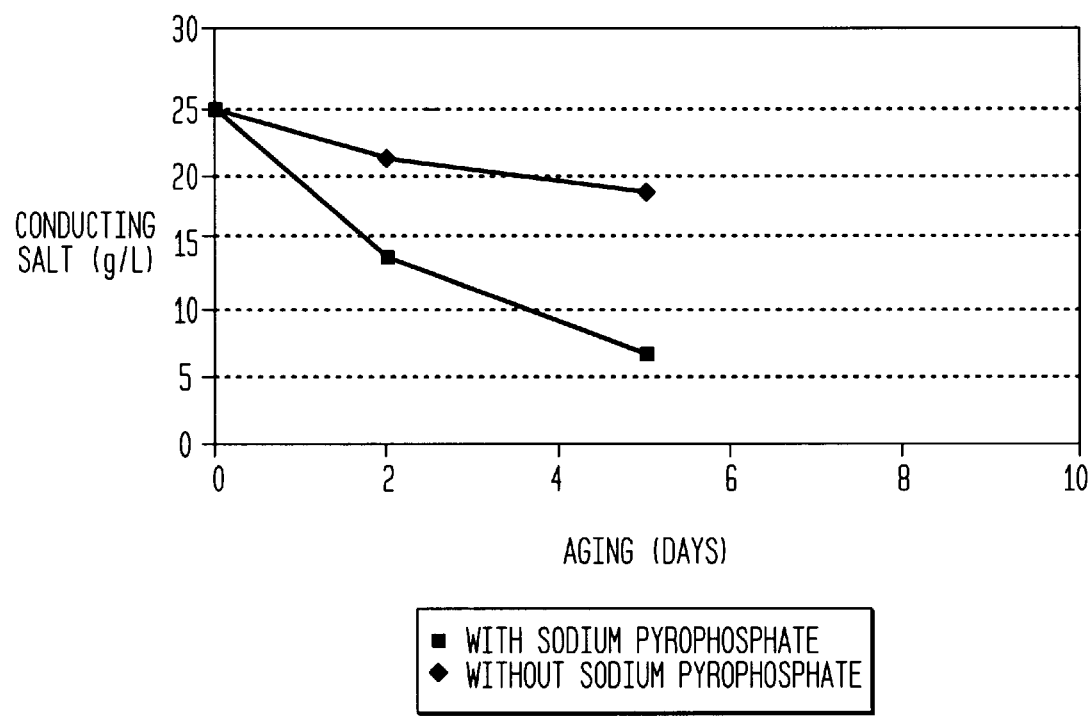
FIG. 2 illustrates a comparison of the total sodium sulfite conducting content in the solid plating process with and without 25 g/l of sodium pyrophosphate after 5 days at 50° C.

The graph in FIG. 2 demonstrates how the addition of the pyrophosphate salt (25g/L) to an electroplating bath containing sodium gold sulfite will extend the life of the bath over a period of time by extending the life of the conducting sodium sulfite salt.

Example 5
Deposit Material Properties

Determining the physical and mechanical properties for electrodeposits depends on the method of testing and the conditions of the plating process. Therefore the characteristics can vary drastically depending on the procedure used. The following is an example of the deposit material properties obtained using an electroplating bath of the present invention:

Hardness: $\leq 90$ $KHN_{25}$
Composition: >99.9% (wt.) Au
Density: 18.9 g/cm$^3$
Contact Resistance: <3 milliohm Example 6
Large Scale Production of a Concentrated Sodium Gold Sulfite Solution 2200 g of gold are dissolved in Aqua Regia (1part nitric acid and 3 parts hydrochloric acid) in a Pfaudler kettle. When the gold is dissolved, the solution is boiled to remove the nitric acid. 660 g of pure sodium chloride are added, and the solution is boiled to dryness to produce $Na(AuCl_4)$.

40 Liters of deionized water are added to the $Na(AuCl_4)$, and the solution is heated to 80° C. 2200 g of barium hydroxide octahydrate are added and mixed well. 1320 g of NaOH are dissolved in a minimum quantity of deionized water and are added to the solution until a greenish-brown color appears. The solution is then boiled for approximately 15 minutes. At this point, the pH can be checked and adjusted to between 6 and 8 using HCl or NaOH.

The resulting suspension is cooled and the precipitate is filtered through a fine filter. The filtrate is placed into a tared container. The precipitate is then washed with three 5 gallon buckets of deionized water.

3300 g of sodium hydrogen sulfate and 4000 g of sodium sulfite are added to a 100 liter glass vessel with approximately 30 L of deionized water and mixed thoroughly. The washed precipitate is then added to the vessel with mixing, and the solution is heated to no greater than 60° C. until the solution turns purple. The solution is removed from the heat and left to stand overnight.

The upper clear portion of the solution is carefully filtered without disturbing the purple precipitate. The filtrate is placed into a tared container. The purple residue is filtered into a separate container and refiltered, if necessary, until the solution is clear. The clear solution is then combined with the initial filtrate in the tared container. The solution is sampled for gold content (g/l% by weight). The pH is adjusted to about 8. The gold content is then adjusted to the desired concentration.

What is claimed is:

1. A process for producing a sodium gold sulfite solution, comprising:
    (a) dissolving $Ba(OH)_2$ in an aqueous solution of $Na(AuCl_4)$ to produce a mixture;
    (b) mixing NaOH with said mixture to produce a suspension;
    (c) boiling the resulting suspension;
    (d) adjusting the pH of the suspension from step (c) to produce a precipitate and a filtrate;
    (e) dissolving $Na_2SO_3$ in a slurry of the precipitate from step (d) to produce a suspension;
    (f) heating the suspension from step (e);
    (g) filtering the suspension from step (f) to produce a filter cake and a filtrate; and
    (h) recovering filtrate as sodium gold sulfite in solution.

2. The process according to claim 1, further comprising in step (a), heating the aqueous solution of $Na(AuCl_4)$ to a temperature of about 70° to 90° C. prior to dissolving the $Ba(OH)_2$.

3. The process according to claim 2, wherein the temperature is approximately 80° C.

4. The process according to claim 1, wherein the pH in step (d) is adjusted if necessary to be between about 6 and 8.

5. The process according to claim 1, wherein the NaOH in step (b) is a concentrated aqueous solution.

6. The process according to claim 1, wherein in step (f), the suspension is heated to about 50°–65° C.

7. The process according to claim 1, further comprising heating the slurry of the precipitate from step (d) to about 55–65° C. prior to dissolving the $Na_2SO_3$.

8. A process for producing a sodium gold sulfite solution, comprising:
    (a) dissolving $Ba(OH)_2$ in an aqueous solution of $Na(AuCl_4)$ to produce a mixture;
    (b) mixing NaOH with said mixture to produce a suspension;
    (c) boiling the resulting suspension;
    (d) adjusting the pH of the suspension from step (c) to produce a precipitate and a filtrate;
    (e) dissolving $Na_2SO_3$ in a slurry of the precipitate from step (d) to produce a suspension;
    (f) heating the suspension from step (e) to about 50°–65° C.;
    (g) filtering the suspension from step (f) to produce a filter cake and a filtrate;
    (h) recovering filtrate as sodium gold sulfite in solution;
    (i) adding $Na_2SO_3$ to the filtrate from step (d) to produce a solution;
    (j) acidifying the resulting solution with sulfuric acid while heating to precipitate $BaSO_4$;
    (k) collecting the $BaSO_4$ precipitate and combining with the filter cake from step (g) to produce a mixture;
    (l) heating the mixture with aqua regia to produce a clean $BaSO_4$ precipitate and a filtrate;
    (m) collecting the filtrate from (l) and adding NaCl to produce a solution;
    (n) evaporating the solution from step (m) to obtain $Na(AuCl_4)$; and
    (o) recycling the $Na(AuCl_4)$ into step (a).

* * * * *